(12) United States Patent
Trachte (10) Patent No.: US 11,198,462 B2
(45) Date of Patent: Dec. 14, 2021

(54) SENSOR STRUCTURES ON A STEERING WHEEL

(71) Applicant: Ralf Trachte, Aarau (CH)

(72) Inventor: Ralf Trachte, Aarau (CH)

(*) Notice: Subject to any disclaimer, the term of this patent is extended or adjusted under 35 U.S.C. 154(b) by 232 days.

(21) Appl. No.: 16/395,688

(22) Filed: Apr. 26, 2019

(65) Prior Publication Data

US 2019/0248402 A1 Aug. 15, 2019

Related U.S. Application Data

(63) Continuation of application No. PCT/IB2017/056644, filed on Oct. 26, 2017.

(30) Foreign Application Priority Data

Oct. 26, 2016 (CH) .................................... 01435/16

(51) Int. Cl.
*B62D 1/04* (2006.01)
*B62D 1/06* (2006.01)
(Continued)

(52) U.S. Cl.
CPC ............. *B62D 1/046* (2013.01); *B62D 1/065* (2013.01); *G01D 5/24* (2013.01); *G06F 3/0445* (2019.05);
(Continued)

(58) Field of Classification Search
CPC .. G01D 5/00; G01D 5/12; G01D 5/14; G01D 5/24; G01D 5/2405; G01D 5/241;
(Continued)

(56) References Cited

U.S. PATENT DOCUMENTS 10,967,737 B2 * 4/2021 Tanaka ................... B60K 35/00
11,037,461 B2 * 6/2021 Best ......................... G09B 9/05
(Continued)

FOREIGN PATENT DOCUMENTS

DE 102009058138 A1 6/2011
DE 102014117823 A1 6/2016
(Continued)

OTHER PUBLICATIONS

International Search Report for PCT/IB2017/056644; dated Feb. 6, 2018; 2 pp.

*Primary Examiner* — Hoai-An D. Nguyen
(74) *Attorney, Agent, or Firm* — Miller Johnson (57) ABSTRACT

A sensor device includes a sensor structure wrapped around a surface of a steering wheel element. The sensor structure includes a substrate material, first sensor lines made from conductive material and formed on the substrate material, second sensor lines made from conductive material, and feed lines. The first sensor lines extend in a first direction. The second sensor lines extend in a second direction. The first direction and the second direction have a non-zero angle between them. The sensor device includes an electronic control unit configured to measure capacitive values of the sensor structure and detect touch or proximity of fingers or hands, which are distinguishable in their position on the surface, based on the measurement. The feed lines are configured to electrically connect the first sensor lines to the electronic control unit.

20 Claims, 3 Drawing Sheets

(51) Int. Cl.
*G01D 5/24* (2006.01)
*G06F 3/044* (2006.01)
*G05D 1/00* (2006.01)

(52) U.S. Cl.
CPC .......... *G06F 3/0446* (2019.05); *G06F 3/0447* (2019.05); *G05D 1/0061* (2013.01); *G06F 2203/04103* (2013.01)

(58) Field of Classification Search
CPC ...... G01D 5/2412; G01D 5/2417; G05D 1/00; G05D 1/0055; G05D 1/0061; B62D 1/00; B62D 1/02; B62D 1/04; B62D 1/046; B62D 1/06; B62D 1/065; G06F 3/00; G06F 3/01; G06F 3/03; G06F 3/041; G06F 3/044; G06F 3/0445; G06F 3/0446; G06F 3/0447; G06F 2203/04103; G01R 27/00; G01R 27/02; G01R 27/26; G01R 27/2605; H03K 17/955
USPC .............. 324/600, 649, 658, 661, 663, 686; 345/156, 173, 174; 702/47, 52
See application file for complete search history.

(56) References Cited

U.S. PATENT DOCUMENTS

| | | | |
|---|---|---|---|
| 11,072,346 B2* | 7/2021 | Okada | B60W 50/0098 |
| 2014/0225855 A1* | 8/2014 | Aitchison | G06F 3/041 345/173 |
| 2015/0029111 A1* | 1/2015 | Trachte | B62D 1/046 345/173 |
| 2015/0123947 A1* | 5/2015 | Jubner | B60K 37/06 345/175 |
| 2017/0254675 A1* | 9/2017 | Hein | G01L 1/142 |
| 2017/0305453 A1* | 10/2017 | Nishio | B62D 1/046 |

FOREIGN PATENT DOCUMENTS

| | | |
|---|---|---|
| WO | WO-2005096131 A2 | 10/2005 |
| WO | WO-2015055172 A1 | 4/2015 |
| WO | WO-2016096815 A1 | 6/2016 |

* cited by examiner

SENSOR STRUCTURES ON A STEERING WHEEL

This application is a continuation of international patent application PCT/IB2017/056644, filed on Oct. 26, 2017 designating the U.S., which international patent application has been published in German and claims priority from Swiss patent application CH/01435/16, filed on Oct. 26, 2016. The entire contents of these prior applications are incorporated herein by reference.

BACKGROUND OF THE INVENTION

There exists a need for complex hands-on recognition and possibilities of touch entry of data on the steering wheel, inter alia, for transitional phases to autonomous driving, for example by way of gestures. One problem with the technical solutions thus far is that only very simple yes/no hands-on recognition or only recognition by simple sectors or by one coordinate along the circumference is possible on the steering wheel rim surface. Yet solutions are desired which afford a greater coverage of the surface with fine-resolution structure, so that the surface of the steering wheel rim can serve as a data entry surface and the sensors e.g. can also detect a grasping hand or the fingers of a hand holding the steering wheel. In the prior art, there are no suitable deformable sensors available and conflicts exist with the integration of the necessary plethora of feed lines.

Problems in the prior art also include the ease of manufacture and long-term stability during operation. The steering wheel, being a closed ring, imposes special requirements and is subjected to special stresses. Thus far, no surface-covering and fine resolution of the sensors is possible. Problems involving the integration of sensors in the steering wheel rim include the choice of material, the ease of manufacture, and the deformability. Innovative possibilities are mentioned here for the realization of the sensor, shield and feed line structures.

SUMMARY OF THE INVENTION

The present invention proposes to enclose the steering wheel rim extensively with a plurality of sensors or a sensor lattice structure and to lead the feed lines inward through a joint in this sensor surface. The sheathing may be interrupted in particular on one line along the rim surface in order to lead inward a plurality of feed lines there. Thus, a very large number of lattice lines can also be led inward there, for example in order to then be led further in their own plane along the steering wheel rim.

The peculiarity here is that the surface of the annular body steering wheel rim can be largely covered with a fine-resolution sensor structure, so that fine displacements of fingers in any given direction can be measured for almost all points on the steering wheel rim and moreover the large number of feed lines is accommodated in the design. The installation in particular of X lines and Y lines intersecting at a short distance enables a measurement of individual fingers in their exact position and furthermore also the measurement of complex touch surfaces, i.e., a real multi-touch, in order to be able to recognize variants of the touching and grasping of the hands. A multichannel technology on the steering wheel rim enables real multi-point multi-touch measurements, so that in the ideal case finger and hand contact surfaces are measured. The variants proposed here solve problems occurring due to the special shape of the toroidal steering wheel rim: long sensor lengths and line lengths especially along the rim, which are integrated by a multilayered construction with interconnected levels—e.g., by folding—optionally outfitted with a line length compensation by special curve forms, and the complex three-dimensional deformations required for the sheathing of the steering wheel rim and ultimately placed in a toroidal shape in particular, and robust practicable integration of the sensor in the steering wheel.

In general: a sensor matrix structure is thus placed in the form of a tubular ring or a tubular ring element. Feed lines of the sensor levels are led inward through joints, beneath or into a shield.

The disclosed solutions in particular can extensively enclose the steering wheel rim. Partial areas of the steering wheel or a similar input device can also be outfitted with these sensors.

DETAILED DESCRIPTION OF THE PREFERRED EMBODIMENTS

The steering wheel rim is a torus or annular body. Its smaller cross sectional circles are known as meridians. The inner, i.e., internally encircling line of the annular body is known as the internal equator.

The solutions proposed here for a sensor are characterized in particular in that a three dimensionally shaped sensor matrix structure largely covers the steering wheel rim surface and its feed lines are led inward or underneath the sensor surface through gaps or joints in the steering wheel surface or in the sensor matrix structure. This plurality of feed lines can run there underneath or in a shield.

In one important but not exclusive variant, the sensor can be produced in a multilayered construction in which sensor structures, feed line structures and shield structures are created together as an important step of the method. In this construction, the feed lines may run for example in a shield or beneath a shield level of the construction. For this, or in a later step of the method or in several steps of the method, the construction can be deformed in order to form the steering wheel rim surface.

The sensor structure in the preferred, but not exclusive embodiment, may be realized as a capacitively active lattice of X lines and Y lines. These lattices consist either of conductors intersecting at short distance or furthermore have surface expansions within their level in order to heighten the capacitive effect. These expansions are in rhombus shape in particular.

Thus, it is basically a sensor device consisting of touch or proximity sensitive sensors on a steering wheel rim or on a steering wheel element, linked to an electronic control unit, characterized in that it can recognize touch or proximity of fingers or hands, which are distinguishable in fine resolution in their surface position on the surface of the steering wheel rim, in that a sensor structure in the form of a plurality of sensor elements or a matrix structure is formed in three dimensions and spread out flat on the surface of the steering wheel rim. Its feed lines are thus led inward beneath the structure and beneath a shield or in a shield.

Fine resolution means in particular that individual fingers are distinguishable. For this, in particular, a multichannel sensor technology is needed. Such a sensor consists in particular of sensor structures, feed line structures, and shield structures. The sensor structure as a fine-resolution multichannel sensor extensively encloses the steering wheel rim or sections of the steering wheel rim along its meridians and has a three dimensional shape for this purpose.

Said structure optionally consists in part of piezoelectric sensors, resistance measuring sensors, or other pressure, touch or proximity sensors.

In particular, the sensor consists of capacitive X-Y matrix structures. In one important embodiment, the conductor lines may here have surface broadenings, e.g., rhomboidal structures. The sensor structure applied may be pre-deformed so that it is geometrically uniform after the stretching or installation.

The surface broadening of the lines may also be a conductive fabric, composed of flat bands, such as copper or carbon fabric. It can be used as a surface and needs to be provided with insulation in order to be used as a sensor, in order to isolate the individual strands from each other. A particular flat band may first be connected by its fibers to a contact terminal, for example, then be coated with insulation, and then be braided into a fabric.

The feed lines may be led inward underneath the sensor surface—especially a tubular surface—by being folded or bent or led across contacts. In particular, this may be done by 180° folding or bending of the multilayered construction or by means of contacts, welds, or through-contacts.

In particular, they may be led in a three-dimensional or tubular shaped level beneath the actual sensor level, which in turn is protected against the actual sensor by a three-dimensional or tubular shaped shield level.

These principles—e.g., folding, bending or contact—may correspondingly also be used to lead the incoming feed lines at a meridian inward and in the direction of the processor tail.

Figure 1:
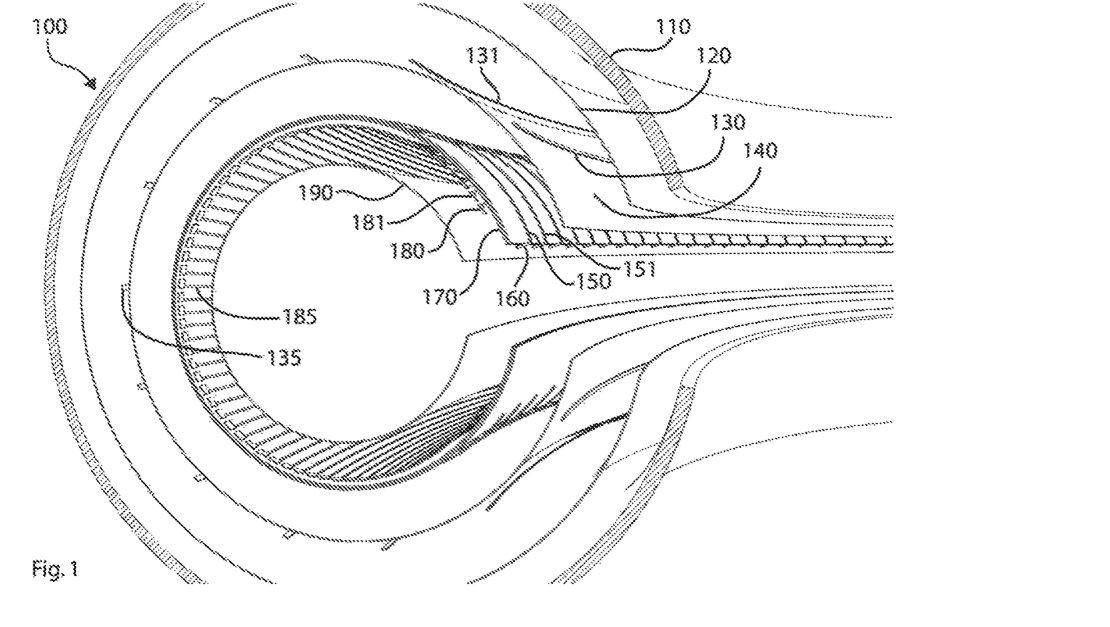
FIG. 1 shows an exemplary embodiment of a sensor on the steering wheel rim or steering wheel element consisting of a sensor matrix, feed lines and shields, shown in cross section and cut open and radially pulled apart as an exploded diagram.

FIG. 1 shows an exemplary embodiment of a sensor in the steering wheel rim or in the steering wheel element 100 in cross section, consisting of a sensor matrix, feed lines, and shields. The annular body in the figure is opened along an equatorial joint and pulled apart radially, in the manner of an exploded drawing. The enclosing sensor matrix is interrupted by a gap at the equator, where feed lines of the X lines are led inward in this embodiment.

Optionally, the sensor is enclosed in a sheath 110 and a protective layer 120. Next comes a substrate layer 140 for the upper conductive structures, here for example Y lines such as 130, 131 and 135. The three-dimensional sheathing of the annular body is done in particular with these Y lines and X lines such as 150 and 151. These are respectively led inward with contact pieces such as 160 and are connected to feed lines such as 180, 181 and 185.

In this variant, the substrate layers are shown separately from the conductors as an exploded drawing, but conductors may also lie within the corresponding substrate layer, e.g., in a fabric. Here, the substrate layer for the X lines such as 150 and 151 is shown together with an intervening shield level and the substrate layer for inward led feed lines below this as a three-layer construction 170. Finally, there may be a shield level 190 on the inside, for example.

Figure 2:
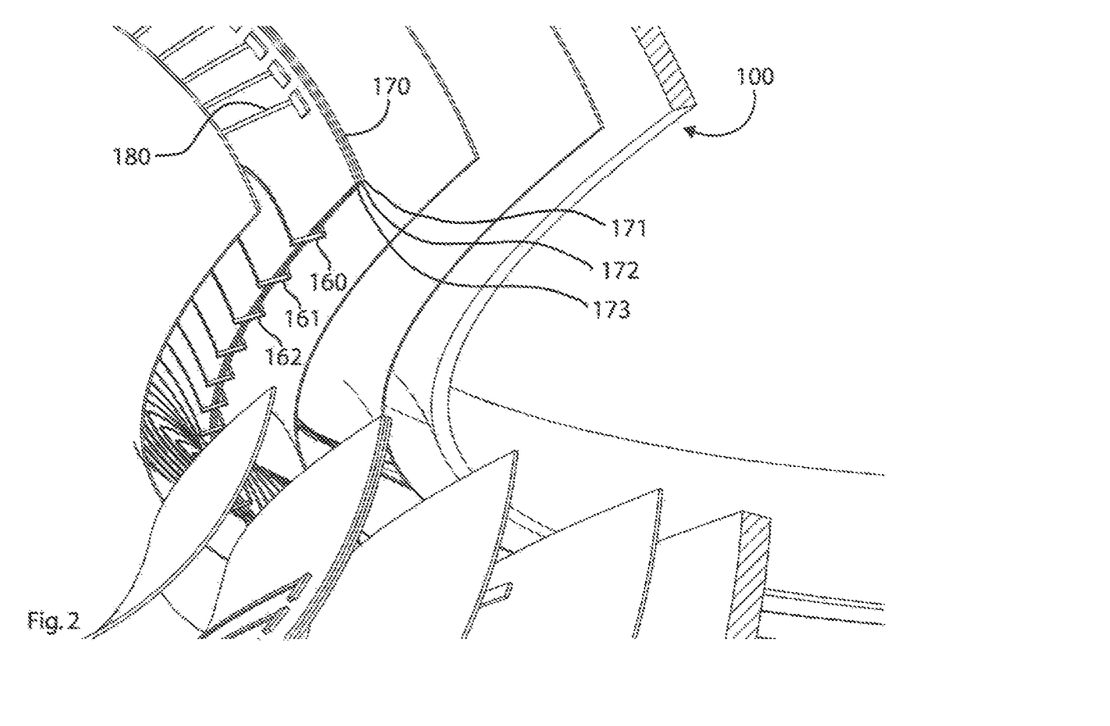
FIG. 2 shows the same embodiment as FIG. 1 in a somewhat different perspective with enlargement.

FIG. 2 shows the embodiment of FIG. 1 enlarged. One can see the internal three-layer construction 170 with three levels: the substrate layer 171 for sensor structures, the flat or lattice-like shield level 172 and the substrate layer 173 for feed lines such as 180. The contact pieces such as 160, 161, 162 may be designed in variants: as a bending or folding of the substrate material 171 and 173 including conductors by 180° in particular or as through contacts between two layers or as a conducting piece. For example, the contact 160 is connected to the feed line 180 on the substrate layer 173.

The feed lines to the sensor structures can be laid such that the length of these respective feed lines is roughly the same and the distances to respectively adjacent feed lines are roughly the same, in order to maintain roughly identical capacitively active properties of the lines. Due to the relative long path along the steering wheel, this compensation may for example facilitate and improve the working of a capacitive data evaluating processor. This length compensation may be achieved, in particular, in that a level with conductor structures has definite paths of the individual conductors.

Figure 3:
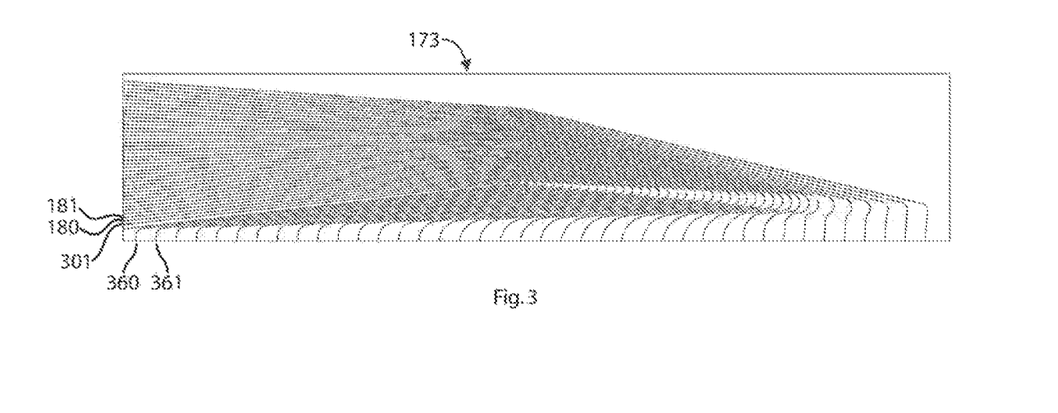
FIG. 3 shows an exemplary embodiment of the developed feed line level with a line length compensation by special curve forms.

FIG. 3 shows one such exemplary embodiment of an important variant of the internal feed line layer 173, shown here in developed view, and corresponding to the deformed layer of FIG. 2. Thanks to the laying of the lines with definite curves, this achieves on the one hand a roughly identical length for all connections on the one hand, and on the other hand roughly equal distances to adjacent lines: connections such as 360, 361 correspond to the contact pieces such as 160, 161 in FIG. 2 and are connected within this layer 173 by a special structure to the further connections such as 180, 181. The conductors traverse the rectangle—yet ultimately deformed especially similar to a tube. The conductor of the most distant input should run if possible with no detouring, like a diagonal for example. The conductor for the closest input runs in the vicinity of the rectangle center and then back to the output. The conductors lying inbetween accordingly have detour curves especially in the zone between the rectangle center and the most distant input. In addition, there is shown here a dummy-conductor 301 as a forward and return loop, which acts as a capacitive parallel line for the interior conductor 180. The conductors may also—with somewhat different laying—provide in turn a compensation for different conductor lengths in another location, such as the path to the steering wheel spokes.

This feed line layer 173 in other variants may also be rolled up with a shield layer or folded one or more times in order to lead it in a cavity, for example. Respective shields for the individual conductors may also be created in such a layer, e.g., by additional printed conductors, so that many coaxial cables are virtually produced.

A shield structure such as 172 beneath the sensor structures may also serve as an electric heating when it is created by a conductor running back and forth as a close-meshed lattice structure and operated with direct current, for example. If necessary, a further shield level 190 may be installed at the inside or below it, in order to exclude any capacitive effects due to the internal metal skeleton of the steering wheel.

In general, a sensor structure may serve at the same time as a heating if the plurality of individual conductors are energized, e.g., by respectively separate current sources supplying direct current or a distinctly lower frequency than the sensor voltages. The individual conductors can be made into a continuous heating conductor by connecting them across inductive frequency barriers.

Sensor structures or feed lines or shields or combinations of these may consist of substrate material with conductive structures applied on both sides. A substrate, such as plastic shells, film, foil, or textile or fabric that is imprinted or vapor deposited or woven on both sides with Y lines and X lines, for example, holds both structures in their position relative to each other also during subsequent deformation steps.

In order to manufacture such a sensor device in general, sensor structures or feed lines or shields may be deformed together with a substrate material or are inserted or woven or cast or foamed in a substrate material or these methods are combined.

Sensor structures or shields or feed lines may be produced together with substrate materials by a series of deformation steps.

Figure 4:
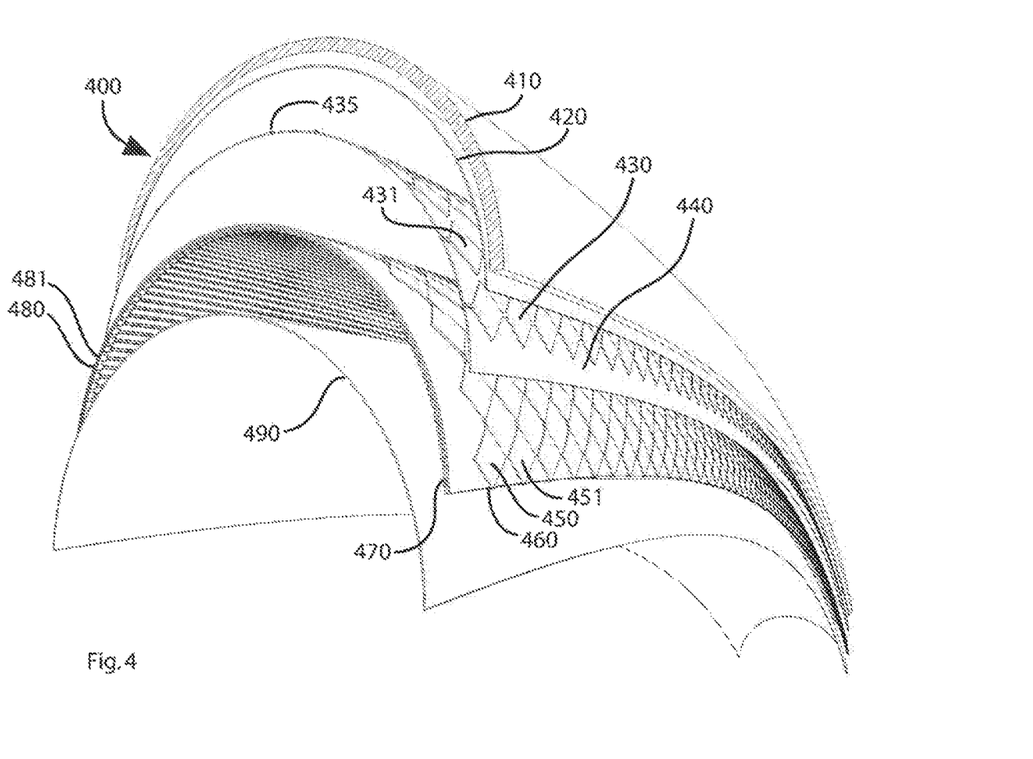
FIG. 4 shows an exploded diagram of an exemplary layout of the levels of a sensor in the variant with matrix surface expansions in the not yet completely deformed state.

FIG. 4 shows an exemplary construction of levels with matrix surface expansions in the not yet fully deformed state for a steering wheel element 400 as an exploded diagram: upper sensor lines such as 430, 431, 435 on substrate material 440, lower sensor lines such as 450, 451 and an inner feed line level with lines such as 480, 481. The three-layered construction 470 contains one substrate material level on top and bottom and inbetween a shield level. In the later remaining gap of the sensor surface, this construction will be passed around by bent or folded lines or contact pieces such as 460, which connect the lines of the sensor level such as 450, 451 to their feed lines such as 480, 481. Furthermore, an inner shield 490 or a covering 420 and a leather sheath 410, for example, may be present.

Figure 5:
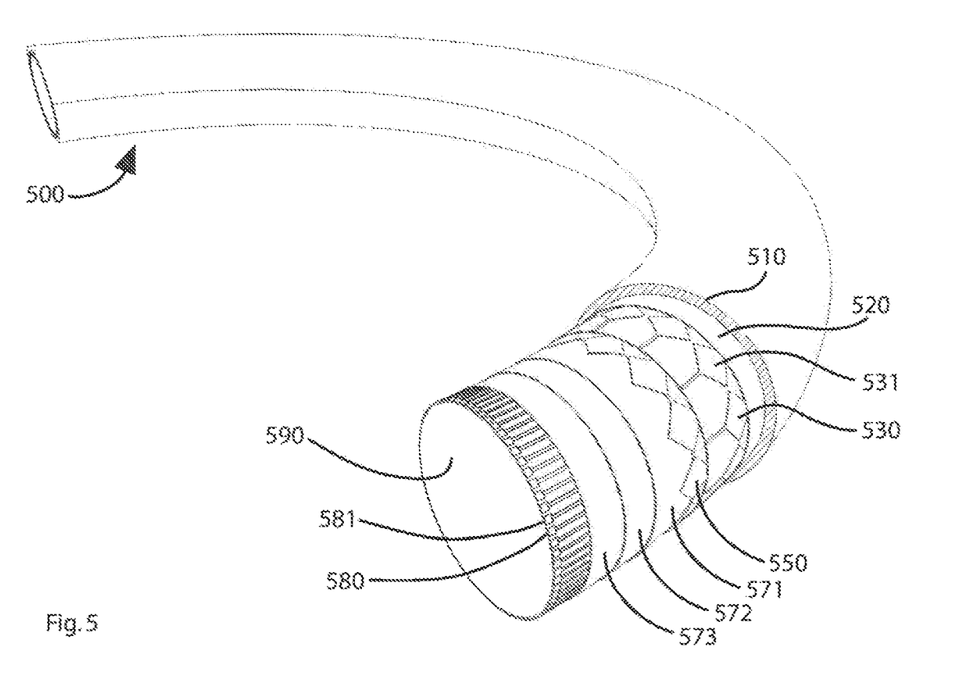
FIG. 5 shows an exemplary steering wheel rim in cross section with levels of the sensor matrix exposed layer by layer, with surface expansions, feed lines and shields.

FIG. 5 shows levels exposed layer by layer for a steering wheel 500 as an exemplary embodiment of a sensor matrix with surface expansions: upper sensor lines such as 530, 531, lower sensor lines such as 550, an inner feed line level with lines such as 580, 581 and shield level 572 and substrate material 571 and 573. Furthermore, an inner shield 590 and a covering 520 and a leather sheath 510, for example, may be present. The tube-like sensor is shielded against its own tube-like feed lines.

Thus, as an important method for the manufacture, a sensor is ideally created as a multilayered construction, bent or folded on the later equator line, then bent sideways in the direction of a circle cross section, i.e., curved in the direction of a tube or a tube element, and then deformed into the annular body or curved annular element or brought into this shape e.g., by mounting on the steering wheel. Corresponding shell shapes or partial shells may also be created and installed. A multilayered three-dimensional pre-deformed construction can be brought into a shape that remains somewhat elastic, so that it can be mounted, e.g., one made of 2 tubes of semicircular shape with slicing at the internal equator or 4 half-tubes in semicircular shapes or 8 quarter-circle half-tubes.

As the method for the production of said fine-resolution flat sensor, it is proposed in particular as an important, but not exclusive embodiment, to deform sensor structures and shields and feed lines together with a substrate material.

For example, a substrate such as plastic shell, film, foil, textile or fabric provided on both sides with conductor structures such as a plurality of sensor elements or a matrix structure or with feed lines or with shields in the first step, can then be bent or folded in a second step in order to lead the feed lines inwardly. In particular, the feed lines can be folded beneath the lower sensor level, and a shield level is placed between these two levels. This placement may also be done, e.g., during the folding process. The substrate provided with conductors on both sides can hold both sensor levels in precise position to each other and at the same time integrate further: in particular, if—unlike what is shown in FIGS. 1, 2, 4 and 5—the sensor level with the larger line count, with lines running as meridians, is laid on top and produced together with its feed lines, e.g., as in FIG. 3, in the same level initially, and if the sensor level with the smaller line count, i.e., with the lines running parallel to the steering wheel rim, is produced as a back level together with a shield structure—placed to the side of it—then their folding or bending along the later inner equator line will result in the correct construction: upper sensor structure, lower sensor structure, shield structure, feed lines of the upper sensor structure. This shield structure may optionally be configured, e.g., as a narrow-mesh lattice of forward and return conductors and thus serve at the same time as a steering wheel heating. In this variant, contact pieces such as 460 would lead somewhat higher from the feed line level to the upper meridian sensor lines.

In a third step, this multilayered construction can be formed three dimensionally. In particular, this is possible by using deformable conductive inks for the first step. This deformation can basically be divided into partial deformation steps, such as a bending of the construction into half-tubes and its curvature to form the annular body. This ultimately results in semi- or quarter-circle segments of shells, for example, which are placed on the circular round steering wheel in a further step. When using film or foils or similar plastically deformable substrates, the resulting shape should have a certain opening along the equator, in order to be elastically mounted and to facilitate the elastic closure on the steering wheel. Here, the later circular cross section of the annular body can remain elastically by an angle of around 75°, for example, which is at first further bent elastically during the installation of the steering wheel so that it can be put in place and then is elastically closed.

Such semi- or quarter-circle segments of shells can then be electronically connected by the steering wheel spokes.

The manufacturing method in another, non-exclusive variant, may contain the step of introducing of conductors into the material volume of a foamed steering wheel blank. In this way, the lowermost level or several subsequent levels of the entire construction can be created in individual steps. In particular, shields or feed lines can be introduced into lower levels or the lower sensor structure can be introduced into the foamed steering wheel blank as wire inlays, for example. Thus, one or more levels of the sensor, feed line and shield structures can be produced by conductors introduced into a material volume, such as plastic foam.

It is advisable, after cutting open the material body and inserting a wire—e.g., by a robot—to close up the material volume once again at once in the same work step, e.g., by welding, heating, pressing together or gluing. A further conductor structure can then be introduced in a higher level. In this way, several such consecutive steps are possible in different levels.

In a further variant, prefabricated conductor structures for sensors, especially for feed lines or shields, may be cast or foamed in the steering wheel blank already before the above-mentioned steps.

Furthermore, there are variants in which the methods mentioned here are combined. One important method or device variant shall be described below as a hybrid solution.

One combination is, e.g., the variant with the following steps: first of all, the lower conductive structures are foamed in, then the middle conductive structures are introduced into the material blank, and then the upper conductive structures are put in place, being deformed together with their substrate material. The upper structures are Y lines in particular; in another variant, Y and X lines are the sensor structures, or in a further variant these together with the shield situated directly underneath.

Such hybrid variants combine substrate material with imprinted or mounted conductor structures and substrate material with inserted, woven, foamed or cast conductor structures.

The following hybrid is an important, but not exclusive embodiment. The upper sensor structures are placed on the underside of a substrate material, especially a shell, foil, or a textile or fabric—in another variant they are woven in here—and the lower sensor structures are inserted or foamed in a substrate material such as foam of the steering wheel blank. Thus, different technologies are combined to make the sensor device. Thanks to this hybrid construction, the upper sensor lines lie precisely on the steering wheel blank and a sufficiently precise distance is maintained between the two sensor levels despite mechanical stresses of the steering wheel rim.

By contrast with the variant shown in FIG. 1, in this hybrid variant it is advisable to arrange the sensor lines with a smaller count, running along the rim, at the bottom: in this way, they can be laid for example as a wire in the material annular body without frequent offset. It is then advisable to produce the sensor lines with a higher count, running transversely to the rim, i.e., in meridians, with deformable substrate material. This offers benefits: for example, the feed lines of the upper lines here may be produced at once as foil, film, textile or fabric together with these upper lines—the multitude of lines is no problem here—and be led inwardly through gaps or through a joint in the sensor surface. There, they can be rolled up, folded, or folded several times, e.g., led in a channel-like cavity along the rim.

In an important but not exclusive variant the formable substrate material can be provided with a shield in its feed line portion on the opposite side, e.g., by flat or close-mesh lattice-like printed conductors or woven conductors. Thus, the formable substrate material here has the feed lines on one side and shields on the other side. In this way, the feed lines can be rolled up or folded in order to accommodate them in the cavity and at the same time they are led between an internal shielding.

At the same time, this portion of the feed lines can be configured in or on the substrate material so that the capacitive effects remain roughly the same for the particular conductor due to the respective line lengths and distances from each other, see FIG. 3.

It may be advisable, in this depicted construction, to install a shield resembling a tubular ring beneath the lower sensor lines, by means of a conductor introduced in a previous step in the annular body material. Such a shield may be created e.g. by laid or foamed or cast conductors.

Feed lines may be laid in a cavity. For example, this can be a channel-like cavity along the steering wheel rim, running beneath a shield, which is introduced or cast or foamed in the material. Feed lines and shields are rolled up, folded, or repeatedly folded together. Furthermore, each time shielding neutral conductors may run between the feed lines. A feed line structure as in FIG. 3 for example can be rolled up or folded in one variant together with one or two corresponding shield levels in the direction of the short side, in order to lead it in a cavity channel along the steering wheel rim.

The proposed three dimensional constructions may also be used basically for sensors with resistance measurement, piezoelectric measurement, or other.

In general, the disclosed solutions enclose the surface of the annular body with a largely continuous fine-resolution sensor structure. Thus, a cohesive and as continuous as possible sensor structure is proposed, which not only consists of individual segments but also extensively and uniformly encompasses the surface. At best, touch events of individual fingers can be detected, and also real multipoint multitouch with many contract points, so that finger and hand contact surfaces are distinguishable.

In particular, this also means a continuous quality in detecting a contact, even in the transition to other regions of the steering wheel, such as from front to back, from top to bottom, and so on. That is, all surface regions are treated with equal rank as much as possible, without certain edges or physical boundaries of the sensors making an appearance.

Separating joints which might also appear on account of the choice of partial shell design can be compensated during the manufacture of the sensor. Post-processing or software can supplement the spatial coordination of the sensor regions, e.g., the succession of points along a meridian. And a sensor line cut in half by joints, for example, can be electrically phased in both parts to make the joint have no effect. Thus, an almost seamless detection of touch or proximity is possible.

Basically the sensors work with multichannel signals, in particular, matrix structures with intersecting lines. These may be used in particular as X-Y structures or e.g. also with surface enlargements such as square patterns and provide a high resolution. A silhouette type recognition of finger and hand portions is basically possible. The three dimensional deformations of the sensors and feed lines can be equalized by algorithms or self-calibration of the newer processors.

In particular, for sensors with enlarged area lines it is possible to utilize evaluation processes which use the phenomena of self-generated capacitance and also phenomena of mutually generated capacitance and different, rapidly changing frequencies. This makes possible real multipoint multitouch evaluations and evaluations of the proximity of fingers in the air space above the surface.

A fine-resolution multichannel sensor can be created in a further embodiment in that conductor structures in groups of respectively different running directions create a sensor matrix, especially by two conductor groups running around in three dimensions in contrary direction to each other and at an oblique angle. For example, two groups of oppositely running and skewed conductors running beneath the surface of the steering wheel rim will generate a sensor matrix, since they run at two different depths and form a multitude of mutual intersection points. One group, for example consisting of 20 conductors, goes for example from one meridian, runs across the annular body at an oblique angle, and intersects with the other group of 20 skewed conductors, for example, which runs in the other direction around the rim. This oblique direction corresponds for example to an angle of around 20°, e.g. for an opened up quarter-circle of the steering wheel which appears as a diagonal on its developed steering wheel rim surface. For example, for each quarter-circle of the steering wheel, a sensor can be connected by two steering wheel spokes.

Thus, one conductor group can largely enclose the rim; together with the second conductor group, a flat sensor matrix is created, producing for example a rhomboidal pattern in top view. The two conductor groups, running in opposite direction and skewed about the annular body, form a matrix. For example, these conductors may be deflected at one meridian and run toward the steering wheel spoke.

As compared to the variant in FIG. 1, the group of the upper lines such as 130, 131, may run on the surface 140 deflected each time to the left by 20°. Thus, the lines of this group run in this view rotating to the left around the annular body. The group of the lower lines, such as 150, 51, instead of starting as here from the right-hand internal equator of the annular body, can start from the meridian sectioned in the plane of the drawing here. Just like the first group, the lines of the second group start at the meridian and run across the levels 170, yet oppositely rotating, i.e., deflected by 20° to the right. In this example, the two groups of lines produce a matrix similar to a rhombus with intersection angles of around 40°.

The special feature of this variant is a different resolution for the sensors in the two directions of its surface. The benefit of this variant is that one does not need a multitude of contacts such as 160 or any long internal feed lines such as 180, 181. The feed lines here remain on the meridian. Here, for example by analogy with the equator of FIG. 1, they can be deflected at the edge of the meridian sectioned here in the drawing. In particular, the conductors arriving at the meridian can be in particular deflected inward and/or greatly narrowed and run toward the spoke.

In the sense of claim 3, this skewed line matrix may also have surface broadenings, which are placed e.g. on a substrate material, so that a stretched rhombus pattern results.

This skewed variant can basically be produced as a film, foil, textile or fabric, e.g., in the sense of a printed foil tube or a knitted tube. Encircling lines here may need to be connected by contacts to a joint and continue onward. An adequate, robust production method is to have inserted wire groups encircling in opposite directions at an oblique angle.

Lines or feed lines running to a meridian of the annular body as their connection meridian can be deflected there, e.g., by analogy with the deflection of the conductor at the inner equator of FIG. 1 and FIG. 2, at the edge of the meridian sectioned there in the drawing. Conductors arriving at the meridian, such as 130, 132, or also the inner ones such as 180, 181, 185, can be deflected downward or inward in particular, e.g., so that they are bent or folded beneath the sensor structure and/or greatly narrowed, running further along the meridian in a ring, and finally running toward the spoke in the direction of the processor, especially through a joint at the inner equator of the annular body. Thus, only a minimal gap is needed in the actual sensor surface: one joint at the meridian and a smaller joint at the equator. The inner conductors such as 180, 181, 185 may also be already deflected on the substrate 173 in the direction of the meridian and be led more narrowly.

The same holds for the conductors arriving at the connection meridian such as 130, 131 or the conductors such as 430, 431 and 435 in FIG. 4. In order to lead out these conductors, a deflection can occur already as a curve on the substrate material 171 or 440, especially by around 90° in the direction of the meridian circular ring, i.e., then continuing as a ring along the meridian. Or the substrate material with the conductors can change its direction by a 45° folding. Or contacts with other conductors can be produced, which then run along the meridian.

Ideally for this, the mentioned feed lines are led inward in relation to the sensor surface by leading them downward already before the deformation step to form the annular body or before the mounting of the entire sensor. This is done in particular by folding them beneath the lower layers of the sensor construction, especially by a 180° folding at the edge, which then corresponds ultimately to the meridian circular ring. This facilitates a production from foil, film, textile, fabric, or the like. Otherwise, direct contacts for example are advisable here.

A slight increase in thickness of the overall construction at the connection meridian can be balanced out in particular by a corresponding slight recess in the steering wheel blank. Or the substrate material with the feed lines is rolled up for example or folded repeatedly in a cavity of the steering wheel blank, running for example in a ring along a meridian.

All of this also applies accordingly to the feed lines in FIG. 4 and FIG. 5, such as 480, 481 or 580, 581 and the arriving conductors such as 530, 531, accordingly on the substrate material 470 or 573. Further shielding levels may be laid here inbetween, if necessary.

The invention claimed is:

1. A sensor device for a surface of a steering wheel element, the sensor device comprising:
    a sensor structure wrapped around the surface, wherein:
        the sensor structure includes:
            a substrate material,
            first sensor lines made from conductive material and formed on the substrate material,
            second sensor lines made from conductive material, and feed lines,
        the first sensor lines extend in a first direction,
        the second sensor lines extend in a second direction,
        the first direction and the second direction have a non-zero angle between them; and
    an electronic control unit configured to measure capacitive values of the sensor structure and detect touch or proximity of fingers or hands, which are distinguishable in their position on the surface, based on the measurement, wherein the feed lines are configured to electrically connect the first sensor lines to the electronic control unit.

2. The sensor device of claim 1, wherein the first sensor lines and the second sensor lines include surface broadening.

3. The sensor device of claim 2, wherein the surface broadening causes the first sensor lines and the second sensor lines to form rhomboidal structures.

4. The sensor device of claim 1, wherein the feed lines are configured to electrically connect the second sensor lines to the electronic control unit.

5. The sensor device of claim 1, wherein the sensor structure extensively encloses the steering wheel element or sections of the steering wheel element along its meridians.

6. The sensor device of claim 1, wherein the feed lines to the sensor structure are led inward through gaps in the sensor surface.

7. The sensor device of claim 1, wherein the feed lines to the sensor structure are led beneath a shield or in a shield.

8. The sensor device of claim 1, wherein the feed lines are folded or bent or led across contacts.

9. The sensor device of claim 1, wherein the feed lines to the sensor structure are laid such that lengths of the feed lines are roughly the same and distances to respectively adjacent feed lines are roughly the same.

10. The sensor device of claim 1, wherein the sensor structure is configured to be energized for electric heating of the steering wheel element.

11. The sensor device of claim 1, wherein sensor lines or feed lines or shields or combinations of these comprise substrate material with conductive structures applied on both sides.

12. The sensor device of claim 1, wherein sensor lines or feed lines or shields are structures that are inserted, woven, cast, or foamed in the substrate material.

13. The sensor device of claim 1, wherein different constellations of substrate material and conductor structure are combined.

14. The sensor device of claim 13, wherein the different constellations comprise substrate material with imprinted or mounted conductor structures, and substrate material combined with inserted, woven, foamed, or cast conductor structures.

15. The sensor device of claim 1, wherein the feed lines to the sensor structure are laid in a cavity.

16. The sensor device of claim 1, wherein an oblique angle is formed between the first direction and the second direction.

17. The sensor device of claim 1, wherein the second sensor lines are separated from the first sensor lines by the substrate material.

18. A method for producing a sensor device for use in detecting touch or proximity of fingers or hands with respect to a steering wheel element, the method comprising:

forming a sensor structure in three dimensions, including forming:
  first sensor lines made from conductive material,
  a substrate material,
  second sensor lines made from conductive material, and
  feed lines electrically connected to the first sensor lines, wherein:
  the first sensor lines extend in a first direction,
  the second sensor lines extend in a second direction,
  the first direction and the second direction have a non-zero angle between them;
spreading the sensor structure out flat; and
deforming the first sensor lines, the second sensor lines, the feed lines, and the substrate material together.

19. The method of claim 18, wherein one or more levels of the sensor lines, feed lines, and shield structures are produced by introducing conductors into a material volume.

20. The method of claim 18, wherein sensor structures lines or shields or feed lines are produced by a series of deformation steps.

* * * * *

UNITED STATES PATENT AND TRADEMARK OFFICE
CERTIFICATE OF CORRECTION

PATENT NO. : 11,198,462 B2
APPLICATION NO. : 16/395688
DATED : December 14, 2021
INVENTOR(S) : Ralf Trachte It is certified that error appears in the above-identified patent and that said Letters Patent is hereby corrected as shown below:

In the Claims

Claim 1, Column 10, Line 27    "and feed lines" should be --and¶ feed lines--

Claim 20, Column 12, Line 19   "sensor structures" should be --sensor--

Signed and Sealed this
Seventeenth Day of May, 2022

*Katherine Kelly Vidal*

Katherine Kelly Vidal
*Director of the United States Patent and Trademark Office*